(12) United States Patent
Yi et al.

(10) Patent No.: US 11,421,155 B2
(45) Date of Patent: Aug. 23, 2022

(54) METHOD FOR PRODUCING CORE-SHELL STRUCTURE INCLUDING CDSE CORE BASED ON GLYME SOLVENT AND CORE-SHELL STRUCTURE INCLUDING CDSE CORE PRODUCED THEREBY

(71) Applicant: KOREA UNIVERSITY RESEARCH AND BUSINESS FOUNDATION, SEJONG CAMPUS, Sejong (KR)

(72) Inventors: Seung Jun Yi, Gyeonggi-do (KR); Sang Ook Kang, Sejong (KR); Ho-Jin Son, Gyeonggi-do (KR)

(73) Assignee: KOREA UNIVERSITY RESEARCH AND BUSINESS FOUNDATION, SEJONG CAMPUS, Sejong-si (KR)

( * ) Notice: Subject to any disclaimer, the term of this patent is extended or adjusted under 35 U.S.C. 154(b) by 954 days.

(21) Appl. No.: 16/301,283

(22) PCT Filed: May 19, 2017

(86) PCT No.: PCT/KR2017/005200
§ 371 (c)(1),
(2) Date: Nov. 13, 2018

(87) PCT Pub. No.: WO2017/204488
PCT Pub. Date: Nov. 30, 2017

(65) Prior Publication Data
US 2020/0318007 A1 Oct. 8, 2020

(30) Foreign Application Priority Data

May 25, 2016 (KR) .......................... 10-2016-0063944

(51) Int. Cl.
C09K 11/88 (2006.01)
B01J 13/00 (2006.01)
B01J 19/00 (2006.01)

(52) U.S. Cl.
CPC ......... *C09K 11/883* (2013.01); *B01J 13/0026* (2013.01); *B01J 19/0013* (2013.01)

(58) Field of Classification Search
CPC .................................................. C09K 11/883
See application file for complete search history.

(56) References Cited

U.S. PATENT DOCUMENTS

| 6,911,082 B2 * | 6/2005 | Sato ........................ B82Y 5/00 117/68 |
| 2008/0251006 A1 | 10/2008 | Didenko et al. |
| 2013/0037762 A1 | 2/2013 | Schrier et al. |
| 2013/0099213 A1 | 4/2013 | Jun et al. |
| 2014/0001436 A1 * | 1/2014 | Welch ..................... C30B 29/48 257/14 |
| 2015/0028288 A1 * | 1/2015 | Onicha ............. H01L 21/02628 257/26 |

FOREIGN PATENT DOCUMENTS

| KR | 10-2008-0027642 A | 3/2008 |
| KR | 10-1029242 B1 | 4/2011 |
| KR | 10-1233790 B1 | 2/2013 |
| KR | 10-2013-0046849 A | 5/2013 |
| KR | 10-1320549 B1 | 10/2013 |
| KR | 10-1326229 B1 | 11/2013 |
| KR | 10-2014-0121346 A | 10/2014 |
| KR | 20140121346 A * | 10/2014 |

OTHER PUBLICATIONS

International Search Report from corresponding PCT Application No. PCT/KR2017/005200, dated Aug. 29, 2017.
Tang, S., et al.; "Glymes as Versatile Solvents for Chemical Reactions and Processes: from the Laboratory to Industry", *RSC Adv.* 2014 ; 4(22): 11251-11287.
Office Action from corresponding Korean Patent Application No. 10-2016-0063944, dated Nov. 5, 2020.

\* cited by examiner

*Primary Examiner* — Yong L Chu
(74) *Attorney, Agent, or Firm* — Harness, Dickey & Pierce, P.L.C.

(57) ABSTRACT

The present invention relates to a method for producing a core-shell structure including a CdSe core based on a glyme solvent. The method of the present invention enables the production of a core-shell structure including a CdSe core in a simple and economical manner. The present invention also relates to a core-shell structure including a CdSe core produced by the method. The core-shell structure of the present invention includes a large amount of CdSe and is uniform in size. Particularly, the core-shell structure of the present invention can be coated on a flexible plastic substrate of an optical device or semiconductor device due to its high stability.

8 Claims, 4 Drawing Sheets

METHOD FOR PRODUCING CORE-SHELL STRUCTURE INCLUDING CDSE CORE BASED ON GLYME SOLVENT AND CORE-SHELL STRUCTURE INCLUDING CDSE CORE PRODUCED THEREBY

CROSS-REFERENCE TO RELATED APPLICATIONS

This application is a national phase application of PCT Application No. PCT/KR2017/005200, filed on May 19, 2017, which claims benefit of Korean Patent Application No. 10-2016-0063944 filed May 25, 2016. The entire disclosures of the applications identified in this paragraph are incorporated herein by references.

FIELD

The present invention relates to a method for producing a core-shell structure based on a CdSe core and a core-shell structure including a CdSe core produced by the method.

BACKGROUND

Many efforts have been devoted to producing quantum dot materials with semiconducting properties in a simple manner, and at the same time, to developing methods for controlling the size of the quantum dots at a constant level. Quantum-dot-sized semiconductor particles are applied to solar cells, light emitting devices, sensors, luminescent markers, bio-diagnostic reagents, etc. and are currently considered materials that have a great influence on many next-generation industrial applications, including energy, display, safety diagnosis, and health care.

Particularly, CdSe is a semiconductor quantum dot material that is currently being developed as a full-color luminescent material due to its excellent luminescent properties. However, CdSe is unstable in air. Due to this fatal disadvantage, CdSe tends to decompose in a short time, losing its inherent luminescent properties. In an attempt to overcome this disadvantage, a CdSe core is covered with a protective film to ensure its stability. A CdSe—ZnS core-shell structure is generally known to ensure the stability of the CdSe core.

For example, Patent Document 1 discloses a method for producing quantum dots for detecting the level of platelet-derived growth factor (PDGF), including: synthesizing cadmium selenide/zinc sulfide quantum dots; dispersing the cadmium selenide/zinc sulfide quantum dots in chloroform and modifying the surface of the dispersed cadmium selenide/zinc sulfide quantum dots with a ligand capable of being dispersed in a polar solvent; and immobilizing a platelet derived growth factor (PDGF) aptamer on the modified surface of the quantum dots. The quantum dots can be applied to the detection of the biosubstance. Further, Patent Document 2 discloses quantum dots including a core composed of insulator particles and a plurality of shells successively surrounding the core and including a semiconductor compound. The band gap of the shell increases as the distance of the shell from the core increases. Further, Patent Document 3 discloses quantum dots including: a core including a compound composed of Group 12 and Group 16 elements; a first shell formed on the surface of the core, including a compound composed of Group 12 and Group 16 elements, and having a larger band gap than the band gap of the core; a second shell formed on the surface of the first shell and including a compound composed of Cd and S in a predetermined molar ratio and Zn and S in a predetermined molar ratio; a third shell formed on the surface of the second shell and including CdS and ZnS in a predetermined molar ratio; a fourth shell formed on the surface of the third shell, including a compound composed of Group 12 and Group 16 elements, and having a larger band gap than the band gap of the third shell; and a fifth shell formed on the surface of the third shell, including a compound composed of Group 12 and Group 16 elements, and having a larger band gap than the band gap of the fourth shell.

Glymes refer to saturated acyclic polyethers. Glymes are known as being environmentally friendly with less volatility and toxicity than general organic solvents. Representative glyme compounds are monoglyme, diglyme, triglyme, and tetraglyme represented by Formulae 1 to 4, respectively:

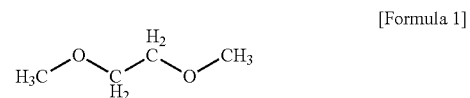

[Formula 1]

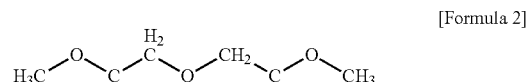

[Formula 2]

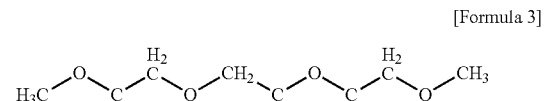

[Formula 3]

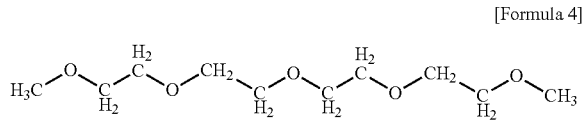

[Formula 4]

Such glyme compounds possess both hydrophilic and hydrophobic properties, unlike general organic solvents, and often form complexes with ions due to their thermal and chemical stability. Due to these advantages, glyme compounds are used in various laboratory applications, such as organic synthesis, electrochemistry, biocatalysis, and chemical vapor deposition (CVD), and in industrial products, such as cleaners, inks, adhesives, coatings, electronic components, heat pumps, and pharmaceutical compositions.

Based on the usefulness of glymes, the present inventors have reported a method for producing hydrogen from an ammonia borane compound using a metal nanocatalyst prepared using a glyme (Patent Document 4) and the use of a glyme for the preparation of metal nanoparticles (Patent Document 5).

However, to the best of our knowledge, no report has appeared on the production of a core-shell structure based on a CdSe core using a glyme that can provide a solution to the problems of conventional methods involving complex processes and high costs.

PRIOR ART DOCUMENTS

Patent Document 1: Korean Patent No. 10-1029242

Patent Document 2: Korean Patent Publication No. 10-2013-0046849

Patent Document 3: Korean Patent No. 10-1320549

Patent Document 4: Korean Patent No. 10-1233790

Patent Document 5: Korean Patent No. 10-1326229

SUMMARY

Problems to be Solved by the Invention

The present invention has been made in view of the problems of the prior art and intends to provide a method for producing a core-shell structure including a CdSe core based on a glyme solvent that can provide a solution to the problems of conventional methods involving complex multi-step processes and high costs associated with the use of many organic solvents. The present invention also intends to provide a core-shell structure including a CdSe core produced by the method.

Means for Solving the Problems

One aspect of the present invention provides a method for producing a core-shell structure including a CdSe core, including the steps of a) dissolving a Cd precursor and a Zn precursor in a glyme solvent and stirring the solution, b) adding 1-octadecene and oleic acid to the solution of step a) and primarily heating the mixture with stirring, c) secondarily heating the solution of step b), and d) dissolving a Se powder in trioctylphosphine (TOP), dissolving a S powder in trioctylphosphine (TOP), and adding dropwise the Se-TOP solution and the S-TOP solution to the solution of step c).

According to one embodiment of the present invention, the Cd precursor used in step a) may be selected from the group consisting of CdO, CdF, CdCl, CdBr, CdI, CdS, $Cd(CH_3CO_2)_2$, $Cd(OH)_2$, $Cd(NO_3)_2$, $Cd(CN)_2$, and mixtures thereof and the Zn precursor used in step a) may be selected from the group consisting of $ZnF_2$, $ZnCl_2$, $ZnBr_2$, $ZnI_2$, $Zn(NO_3)_2$, $Zn(ClO_3)_2$, $ZnSO_4$, $Zn_3(PO_4)_2$, $Zn(O_2CCH_3)_2$, and mixtures thereof.

According to a further embodiment of the present invention, in step a), the molar ratio of Cd present in the Cd precursor to Zn present in the Zn precursor may be from 1:4 to 1:20.

According to another embodiment of the present invention, the glyme solvent used in step a) may be selected from the group consisting of monoglyme, diglyme, triglyme, tetraglyme, and mixtures thereof.

According to another embodiment of the present invention, in step b), the primary heating with stirring may be performed at 120° C. to 160° C. for 10 minutes to 30 minutes.

According to another embodiment of the present invention, in step c), the secondary heating may be performed at 270° C. to 330° C. for 10 minutes to 30 minutes.

According to another embodiment of the present invention, in step d), the molar ratio of Se present in the Se-TOP solution to S present in the S-TOP solution may be from 1:10 to 1:20.

According to another embodiment of the present invention, step d) may be carried out at 260° C. to 300° C. for 10 minutes to 30 minutes.

According to another embodiment of the present invention, the molar ratio of Cd present in the Cd precursor to Zn present in the Zn precursor may be adjusted to 1:20 in step a) and the molar ratio of Se present in the Se-TOP solution to S present in the S-TOP solution may be adjusted to 1:20 in step d) to produce a blue light emitting core-shell structure.

According to another embodiment of the present invention, the molar ratio of Cd present in the Cd precursor to Zn present in the Zn precursor may be adjusted to 1:10 in step a) and the molar ratio of Se present in the Se-TOP solution to S present in the S-TOP solution may be adjusted to 1:10 in step d) to produce a green light emitting core-shell structure.

According to another embodiment of the present invention, the molar ratio of Cd present in the Cd precursor to Zn present in the Zn precursor may be adjusted to 1:4 in step a) and the molar ratio of Se present in the Se-TOP solution to S present in the S-TOP solution may be adjusted to 1:10 in step d) to produce an orange or red light emitting core-shell structure.

According to another embodiment of the present invention, the Se-TOP solution and the S-TOP solution may be sequentially added dropwise in step d) to produce an orange or red light emitting core-shell structure.

According to another embodiment of the present invention, the S-TOP solution may be added dropwise 10 minutes after dropwise addition of the Se-TOP solution in step d) to produce an orange light emitting core-shell structure.

According to another embodiment of the present invention, the S-TOP solution may be added dropwise 30 seconds after dropwise addition of the Se-TOP solution in step d) to produce a red light emitting core-shell structure.

A further aspect of the present invention provides a core-shell structure including a CdSe core produced by the method.

According to one embodiment of the present invention, the core-shell structure may include a central CdSe core and CdS, ZnCdS, and ZnS shells formed in this order from the CdSe core.

Effects of the Invention

The method of the present invention enables the production of a core-shell structure including a CdSe core in a simple and economical manner. The core-shell structure of the present invention includes a large amount of CdSe and is uniform in size. Particularly, the core-shell structure of the present invention can be coated on a flexible plastic substrate of an optical device or semiconductor device due to its high stability.

DETAILED DESCRIPTION

The present invention will now be described in more detail.

The present invention has been made to solve the problems of conventional methods for producing a core-shell structure including a CdSe core that involve complex multi-step processes and high costs associated with the use of many organic solvents. Thus, the present invention is directed to providing a method for producing a core-multi-shell structure including a CdSe core using only a glyme solvent. The present invention is also directed to providing a core-shell structure including a CdSe core produced by the method.

Figure 1:
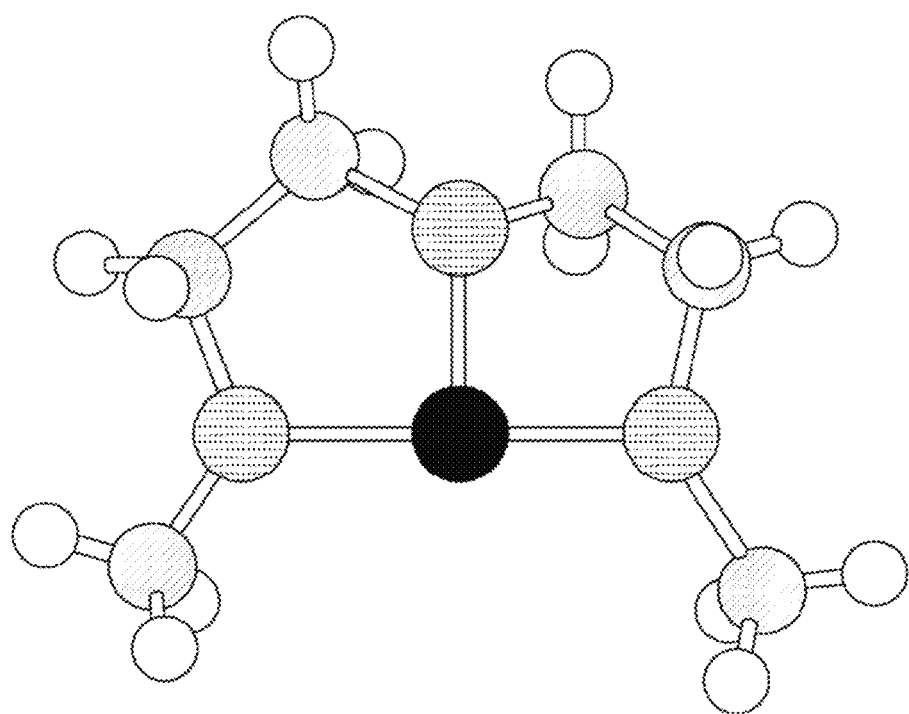
FIG. 1 schematically shows the chemical structure of a chelate of Cd as a precursor of a luminescent material with a glyme.

A glyme has an oxygen-containing open multidentate chelating ligand that is coordinated to Cd as a central metal. FIG. 1 schematically shows the chemical structure of a chelate of Cd as a precursor of a luminescent material with a glyme. The glyme solvent can simultaneously maintain the state of various kinds of precursors in a constant array due to its chelating ability and different binding profiles of the precursors can thus be expressed by simply selecting reaction temperatures. Based on these features of the glyme solvent, the present invention intends to produce a core-multishell structure including a CdSe core.

Figure 2A:
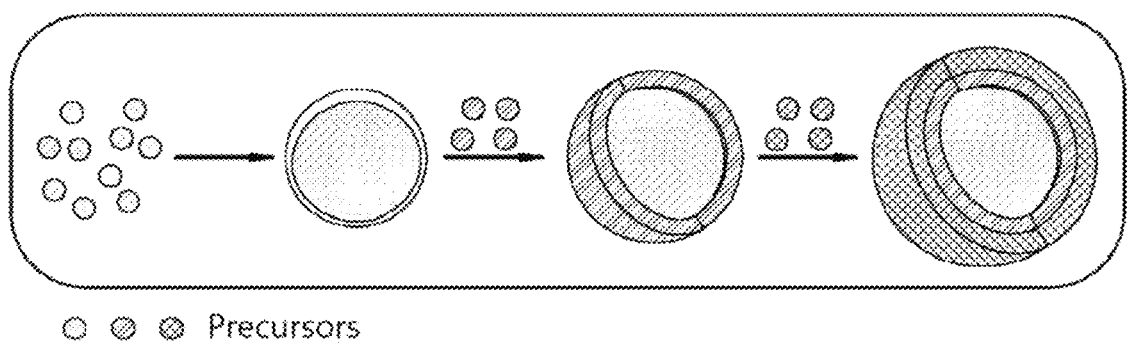
FIGS. 2a and 2b show two exemplary pathways for covering a CdSe core with shells using a glyme solvent.
Figure 2B:
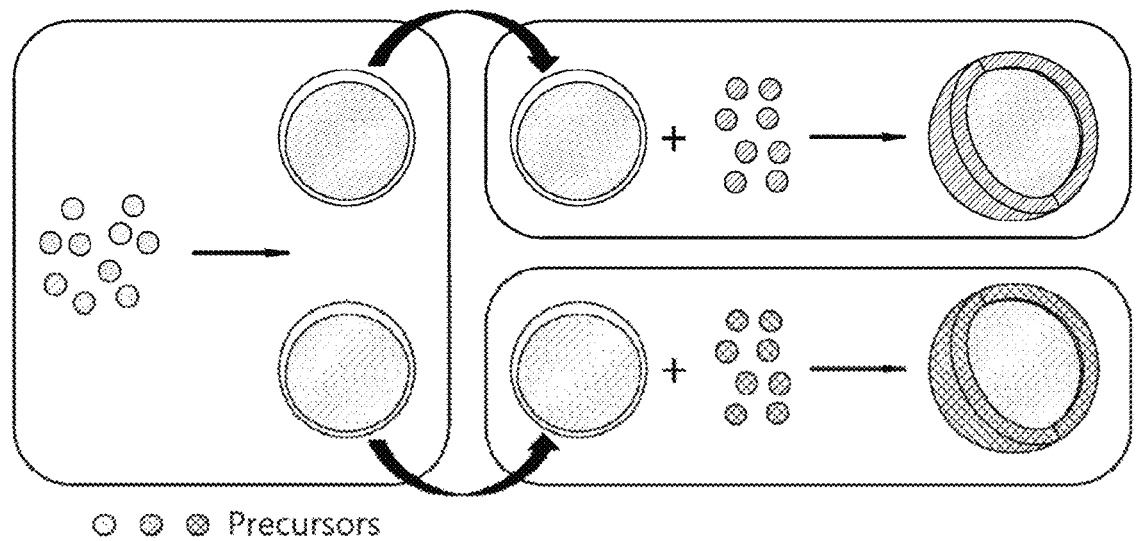

FIGS. 2a and 2b show two exemplary pathways for covering a CdSe core with shells using a glyme solvent. As shown in FIG. 2a, reactions may be carried out to sequentially form different shells on a CdSe core. Alternatively, shells may be successively formed on a CdSe core through one-pot reactions immediately after formation of the CdSe core, as shown in FIG. 2b.

Specifically, the present invention provides a method for producing a core-shell structure including a CdSe core, including the steps of a) dissolving a Cd precursor and a Zn precursor in a glyme solvent and stirring the solution, b) adding 1-octadecene and oleic acid to the solution of step a) and primarily heating the mixture with stirring, c) secondarily heating the solution of step b), and d) dissolving a Se powder in trioctylphosphine (TOP), dissolving a S powder in trioctylphosphine (TOP), and adding dropwise the Se-TOP solution and the S-TOP solution to the solution of step c).

The Cd precursor used in the method of the present invention may be any Cd-containing compound that is used in conventional methods for preparing a CdSe core. Examples of such Cd-containing compounds include CdO, CdF, CdCl, CdBr, CdI, CdS, $Cd(CH_3CO_2)_2$, $Cd(OH)_2$, $Cd(NO_3)_2$, $Cd(CN)_2$, and mixtures thereof. Cd present in the Cd precursor is used to form a CdSe core. Any Zn-containing compound may be used as the Zn precursor in the method of the present invention. Examples of such Zn-containing compounds include zinc stearate, $ZnF_2$, $ZnCl_2$, $ZnBr_2$, $ZnI_2$, $Zn(NO_3)_2$, $Zn(ClO_3)_2$, $ZnSO_4$, $Zn_3(PO_4)_2$, $Zn(O_2CCH_3)_2$, and mixtures thereof. Zn present in the Zn precursor is used to form shells.

In step a), the molar ratio of Cd present in the Cd precursor to Zn present in the Zn precursor may be adjusted to the range of 1:4 to 1:20. If the Cd proportion is more than the upper limit defined above, problems may arise in the composition of the core-shell structure. Meanwhile, if the Zn proportion is more than the upper limit defined above, problems may arise in the composition of the core-shell structure. The method of the present invention enables the production of luminescent structures capable of emitting light of various colors such as blue, green, orange, and red colors by varying the ratio of Cd:Zn, as described below.

Specific examples of suitable glyme solvents include, but are not limited to, monoglyme, diglyme, triglyme, and tetraglyme. These glyme solvents may be used alone or as a mixture thereof.

In subsequent step b), 1-octadecene and oleic acid are added to the solution of step a) and the mixture is primarily heated with stirring. The primary heating with stirring may be performed at 120° C. to 160° C. for 10 minutes to 30 minutes. If the primary heating temperature is lower than 120° C. or the primary heating time is shorter than 10 minutes, problems may arise in core formation. Meanwhile, if the primary heating temperature is higher than 160° C. or the primary heating time is longer than 30 minutes, problems may arise in controlling the composition of a core.

After completion of the primary heating, the resulting solution is secondarily heated to a higher temperature (step c). The secondary heating may be performed at 270° C. to 330° C. for 10 minutes to 30 minutes. If the secondary heating temperature is lower than 270° C. or the secondary heating time is shorter than 10 minutes, problems may arise in shell formation. Meanwhile, if the secondary heating temperature is higher than 330° C. or the secondary primary heating time is longer than 30 minutes, problems may arise in controlling the composition of shells.

After completion of the secondary heating (step c)), the hot reaction solution is colorless and transparent because all reactants undergo complete reactions. Thereafter, a Se powder is dissolved in trioctylphosphine (TOP), a S powder is dissolved in trioctylphosphine (TOP), and the Se-TOP solution and the S-TOP solution are added dropwise to the hot solution of step c) to ensure conditions for shell growth.

In step d), the molar ratio of Se present in the Se-TOP solution to S present in the S-TOP solution may be from 1:10 to 1:20. If the Se proportion is more than the upper limit defined above, problems may arise in controlling the composition of a core. Meanwhile, if the Se proportion is more than the upper limit defined above, problems may arise in controlling the composition of shells. The control over the Se:S ratio enables the production of luminescent structures capable of emitting light of various colors such as blue, green, orange, and red colors, like the control over the Cd:Zn ratio.

In step d), the reaction temperature for shell growth is preferably from 260° C. to 300° C. If the reaction temperature is less than 260° C., problems may arise in controlling the composition of a core. Meanwhile, if the reaction temperature exceeds 300° C., problems may arise in controlling the composition of shells.

As described previously, the control over the Cd:Zn ratio in step a) and the control over the Se:S ratio in step d) enable the production of luminescent structures capable of emitting light of various colors such as blue, green, orange, and red colors.

Specifically, the molar ratio of Cd present in the Cd precursor to Zn present in the Zn precursor may be adjusted to 1:20 in step a) and the molar ratio of Se present in the Se-TOP solution to S present in the S-TOP solution may be adjusted to 1:20 in step d) to produce a blue light emitting core-shell structure.

Alternatively, the molar ratio of Cd present in the Cd precursor to Zn present in the Zn precursor may be adjusted to 1:10 in step a) and the molar ratio of Se present in the Se-TOP solution to S present in the S-TOP solution may be adjusted to 1:10 in step d) to produce a green light emitting core-shell structure.

Alternatively, the molar ratio of Cd present in the Cd precursor to Zn present in the Zn precursor may be adjusted to 1:4 in step a) and the molar ratio of Se present in the Se-TOP solution to S present in the S-TOP solution may be adjusted to 1:10 in step d) to produce an orange or red light emitting core-shell structure.

The Se-TOP solution and the S-TOP solution may be sequentially added dropwise in step d) to produce an orange or red light emitting core-shell structure rather than to produce a blue or green light emitting core-shell structure. The order of addition of the two solutions is important for the production of an orange or red light emitting core-shell structure. An orange or red light emitting core-shell structure is produced by adding dropwise the S-TOP solution after the lapse of a predetermined time from dropwise addition of the Se-TOP solution. Specifically, an orange light emitting core-shell structure is produced when the S-TOP solution is added dropwise 10 minutes after dropwise addition of the Se-TOP solution in step d) and a red light emitting core-shell structure is produced when the S-TOP solution is added dropwise 30 seconds after dropwise addition of the Se-TOP solution in step d).

At this time, the reaction solution is sampled at various time points of the reaction, each sample is dispersed in methanol, the core-shell structure is extracted with a suitable organic solvent such as hexane, the extract is dispersed in a suitable solvent such as toluene, and the spectroscopic data of the core-shell structure is measured to determine whether the desired core-shell structure is grown successfully.

As described above, shells may be successively formed on a CdSe core through one-pot reactions immediately after formation of the CdSe core. Specifically, the glyme and the reactants are mixed together in a reflux flask under a nitrogen atmosphere, the mixture is stirred at room temperature for 30 minutes to 2 hours, and reactions are allowed to further proceed at 50 to 70° C. for 30 minutes to 2 hours and under reflux for 30 minutes to 2 hours. As a result, a CdSe core is formed rapidly at the initial stage of the reaction, and at the same time, CdS, ZnCdS, and ZnS shells are sequentially formed on the CdSe core.

The method of the present invention enables the production of a core-shell structure including a central CdSe core and CdS, ZnCdS, and ZnS shells formed in this order from the CdSe core.

Mode for Carrying Out the Invention

The present invention will be explained in more detail with reference to the following examples. These examples are provided to assist in understanding the invention and are not intended to limit the scope of the invention.

General Procedure

Cadmium oxide (99.99%), selenium (Se) powder (99.5%), sulfur (S) powder (99.98%), zinc stearate (commercial grade), trioctylphosphine (TOP, 90%), 1-octadecene (ODE, 90%), and oleic acid (OA, 90%) were purchased from Aldrich. The Schlenk technique using a glove box (Youjeon Trade Co., Ltd., Korea) and high vacuum lines was applied. Other high vacuum glass products were manufactured in laboratory.

Blue Light Emitting Core-Shell Structure Including CdSe Core 0.4 mmole of CdO was mixed with 8 mmole of zinc stearate (i.e. the molar ratio of Cd to Zn was 1:20) and the mixture was dissolved in 10 mL of a glyme solvent. The solution was stirred at room temperature for 30 min. The reaction solution was mixed with 10 mL of ODE and 33.6 mL of OA. Subsequently, the temperature was raised to 140° C. After 20 min stirring, the mixture was further heated to 300° C. The resulting reaction solution was colorless and transparent, demonstrating complete reactions of all reactants. To the hot glyme reaction solution were rapidly added dropwise 0.4 mmole of a solution of a Se powder in 4 mL of TOP and 8 mmole of a solution of a S powder in 4 mL of TOP. The molar ratio of Se:S was 1:20. The reaction temperature was maintained at 280° C. to ensure conditions for shell growth. The reaction solution was sampled at various time points of the reaction, each sample was dispersed in methanol, the quantum dot structure was extracted with hexane, the extract was dispersed in toluene, and the spectroscopic data of the quantum dot structure was measured to determine the growth of the desired core-shell structure.

Green Light Emitting Core-Shell Structure Including CdSe Core

A green light emitting core-shell structure including a CdSe core was produced in the same manner as in the production of the blue light emitting core-shell structure, except that the molar ratios of Cd:Zn and Se:S were maintained at 1:10 and 1:10, respectively.

Orange Light Emitting Core-Shell Structure Including CdSe Core

An orange light emitting core-shell structure including a CdSe core was produced in the same manner as in the production of the blue light emitting core-shell structure, except that the molar ratios of Cd:Zn and Se:S were maintained at 1:4 and 1:10, respectively, and the S-TOP solution was added dropwise 10 min after dropwise addition of the Se-TOP solution.

Red Light Emitting Core-Shell Structure Including CdSe Core

A red light emitting core-shell structure including a CdSe core was produced in the same manner as in the production of the blue light emitting core-shell structure, except that the molar ratios of Cd:Zn and Se:S were maintained at 1:4 and 1:10, respectively, and the S-TOP solution was added dropwise 30 sec after dropwise addition of the Se-TOP solution.

Figure 3A:
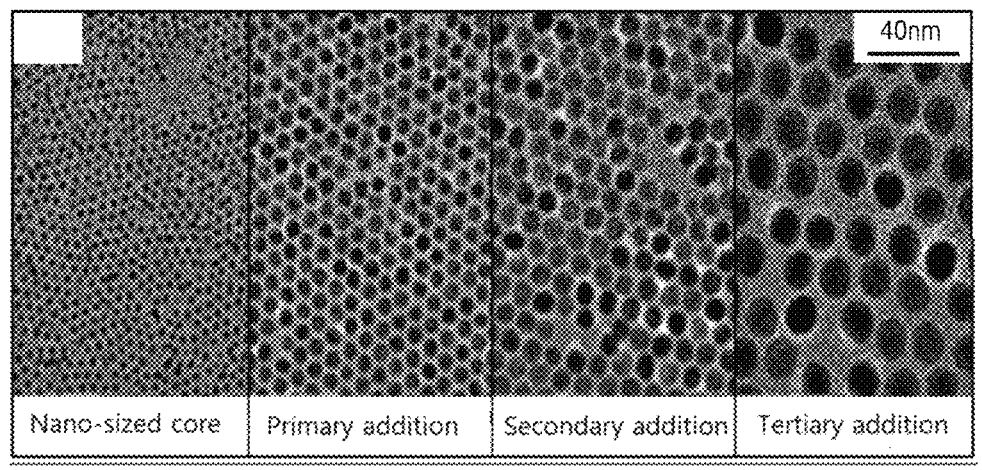
FIGS. 3a, 3b and 3c are transmission electron microscopy images of a starting core before shell formation, intermediates during shell formation, and a product after shell formation (3a), and the final core-multishell structure (3b and 3c).
Figure 3B:
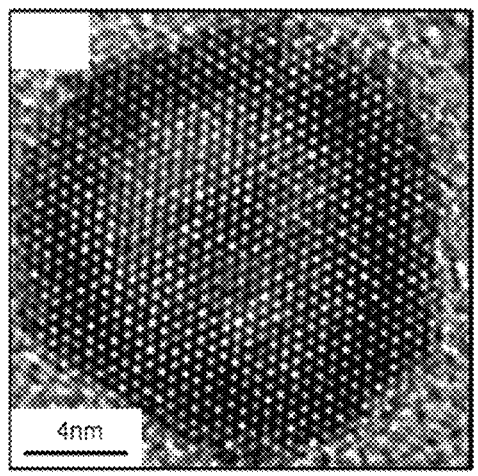
Figure 3C:
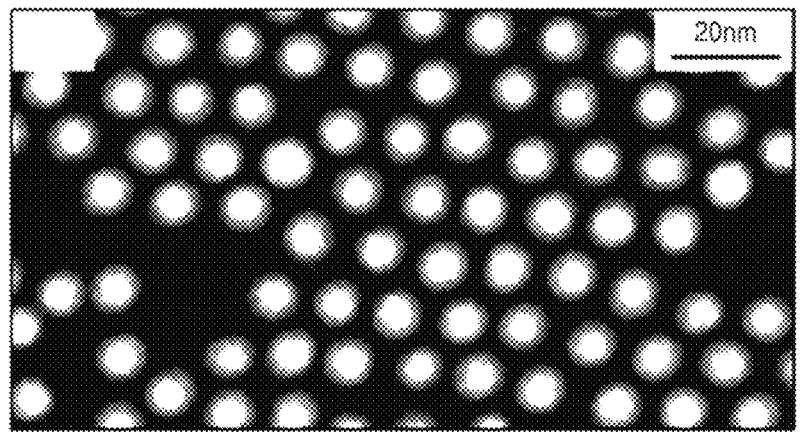

FIGS. 3a to 3c are transmission electron microscopy images of the starting core before shell formation, the intermediates during shell formation, and the product after shell formation (3a), and the final core-multishell structure (3b and 3c). FIGS. 3a to 3c reveal successful synthesis of the core-shell structure after completion of the reactions.

The luminescence quantum yields of the quantum dot materials were calculated by Equation 1:

$$Q = Q_R \frac{OD_R}{OD} \frac{I}{I_R} \frac{n_R^2}{n^2} \qquad \text{[Equation 1]}$$

where Q, OD, I, and n stand for quantum yield, optical density, integrated luminescence intensity, and refractive index of the solvent, respectively, and subscript R stands for a reference sample.

The luminescence quantum yields of the blue, green, orange, and red light emitting core-shell structures were 0.47, 0.59, 0.96, and 0.71, respectively.

Figure 4:
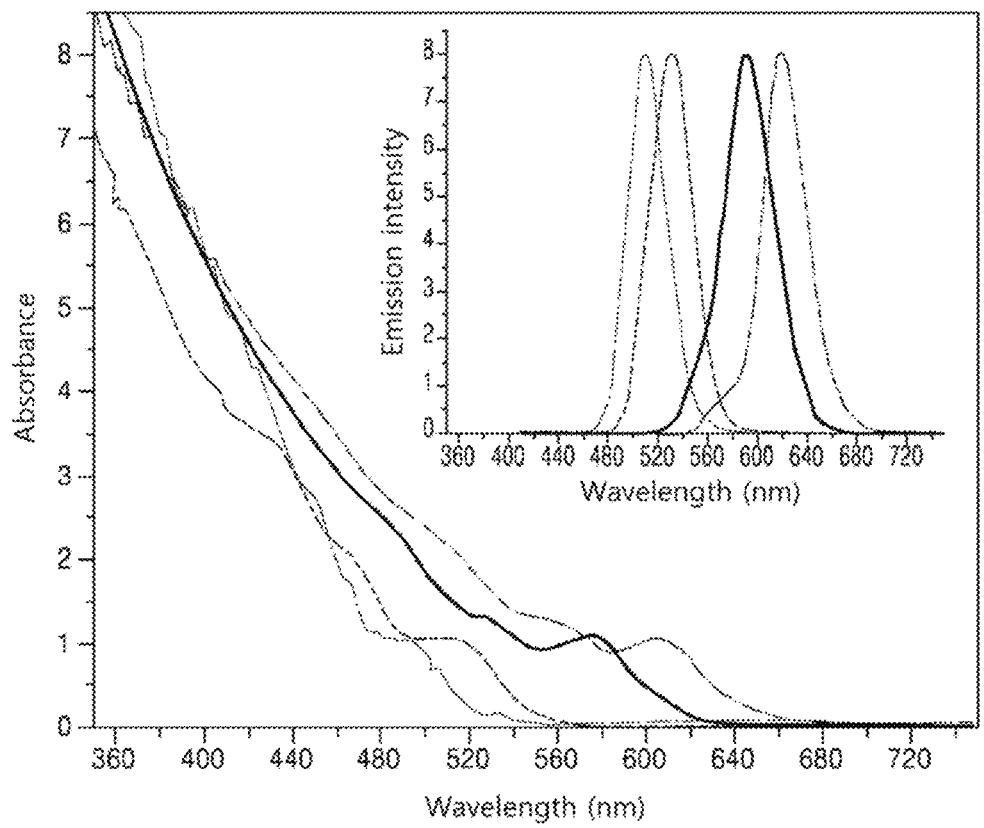
FIG. 4 shows absorption and emission spectra of blue, green, orange, and red light emitting core-shell structures produced in the Examples section.

FIG. 4 shows absorption and emission spectra of the blue, green, orange, and red light emitting core-shell structures. Referring to FIG. 4, the core-shell structures exhibited stable excellent luminescent properties in the corresponding wavelength ranges.

INDUSTRIAL APPLICABILITY

The method of the present invention enables the production of a core-shell structure including a CdSe core in a simple and economical manner. The core-shell structure of the present invention includes a large amount of CdSe and is uniform in size. Particularly, the core-shell structure of the present invention can be coated on a flexible plastic substrate of an optical device or semiconductor device due to its high stability.

What is claimed is:

1. A method for producing a core-shell structure comprising a CdSe core and sequential layers of CdS, ZnCdS, and ZnS shells, wherein the core-shell structure emits a blue light, a green light, an orange light, or a red light, the method comprising the steps of:
   a) dissolving a Cd precursor and a Zn precursor in a glyme solvent and stirring the solution,
   b) adding 1-octadecene and oleic acid to the solution of step a) and primarily heating the mixture with stirring,
   c) secondarily heating the solution of step b), and
   d) dissolving a Se powder in trioctylphosphine (TOP), dissolving a S powder in trioctylphosphine (TOP), and adding dropwise the Se-TOP solution and the S-TOP solution to the solution of step c),
   wherein the molar ratio of Cd present in the Cd precursor to Zn present in the Zn precursor is adjusted to 1:20 in step a) and the molar ratio of Se present in the Se-TOP solution to S present in the S-TOP solution is adjusted to 1:20 in step d) to produce a blue light emitting core-shell structure,
   wherein the molar ratio of Cd present in the Cd precursor to Zn present in the Zn precursor is adjusted to 1:10 in step a) and the molar ratio of Se present in the Se-TOP solution to S present in the S-TOP solution is adjusted to 1:10 in step d) to produce a green light emitting core-shell structure, and
   wherein the molar ratio of Cd present in the Cd precursor to Zn present in the Zn precursor is adjusted to 1:4 in step a) and the molar ratio of Se present in the Se-TOP solution to S present in the S-TOP solution is adjusted to 1:10 in step d) to produce an orange or red light emitting core-shell structure.

2. The method according to claim 1, wherein the Cd precursor is selected from the group consisting of CdO, CdF, CdCl, CdBr, CdI, CdS, $Cd(CH_3CO_2)_2$, $Cd(OH)_2$, $Cd(NO_3)_2$, $Cd(CN)_2$, and mixtures thereof and the Zn precursor is selected from the group consisting of $ZnF_2$, $ZnCl_2$, $ZnBr_2$, $ZnI_2$, $Zn(NO_3)_2$, $Zn(ClO_3)_2$, $ZnSO_4$, $Zn_3(PO_4)_2$, $Zn(O_2CCH_3)_2$, and mixtures thereof.

3. The method according to claim 1, wherein the glyme solvent used in step a) is selected from the group consisting of monoglyme, diglyme, triglyme, tetraglyme, and mixtures thereof.

4. The method according to claim 1, wherein, in step b), the primary heating with stirring is performed at 120° C. to 160° C. for 10 minutes to 30 minutes.

5. The method according to claim 1, wherein, in step c), the secondary heating is performed at 270° C. to 330° C. for 10 minutes to 30 minutes.

6. The method according to claim 1, wherein the Se-TOP solution and the S-TOP solution are sequentially added dropwise in step d) to produce an orange or red light emitting core-shell structure.

7. The method according to claim 6, wherein the S-TOP solution is added dropwise 10 minutes after dropwise addition of the Se-TOP solution in step d) to produce an orange light emitting core-shell structure.

8. The method according to claim 6, wherein the S-TOP solution is added dropwise 30 seconds after dropwise addition of the Se-TOP solution in step d) to produce a red light emitting core-shell structure.

* * * * *